(12) United States Patent
Rabeony

(10) Patent No.: US 9,090,182 B2
(45) Date of Patent: Jul. 28, 2015

(54) SELF-PIVOTING CHILD CAR SEAT TO BE FITTED TO A VEHICLE SEAT

(75) Inventor: Haja Rabeony, Cholet (FR)

(73) Assignee: Dorel Juvenile Group, Inc., Foxboro, MA (US)

( * ) Notice: Subject to any disclaimer, the term of this patent is extended or adjusted under 35 U.S.C. 154(b) by 113 days.

(21) Appl. No.: 14/113,853

(22) PCT Filed: Apr. 27, 2012

(86) PCT No.: PCT/EP2012/057862
§ 371 (c)(1),
(2), (4) Date: Nov. 21, 2013

(87) PCT Pub. No.: WO2012/146761
PCT Pub. Date: Nov. 1, 2012

(65) Prior Publication Data
US 2014/0084650 A1    Mar. 27, 2014

(30) Foreign Application Priority Data

Apr. 29, 2011 (FR) ..................................... 11 53668
Nov. 10, 2011 (FR) ..................................... 11 60293

(51) Int. Cl.
*B60N 2/28* (2006.01)

(52) U.S. Cl.
CPC .............. *B60N 2/2869* (2013.01); *B60N 2/286* (2013.01); *B60N 2/2863* (2013.01)

(58) Field of Classification Search
CPC ....... B60N 2/28; B60N 2/2821; B60N 2/2869
See application file for complete search history.

(56) References Cited

U.S. PATENT DOCUMENTS

| | | | | |
|---|---|---|---|---|
| 6,241,314 | B1* | 6/2001 | Pufall | 297/256.12 |
| 6,431,647 | B2* | 8/2002 | Yamazaki | 297/256.12 |
| 6,520,579 | B2* | 2/2003 | Kassai et al. | 297/256.12 |
| 6,572,189 | B1* | 6/2003 | Blaymore | 297/256.12 |
| 6,938,954 | B1* | 9/2005 | Hendren et al. | 297/256.12 |
| 7,481,492 | B2* | 1/2009 | Lhomme et al. | 297/256.12 |
| 7,490,898 | B2* | 2/2009 | Lhomme et al. | 297/256.12 |
| 7,712,830 | B2* | 5/2010 | Lhomme et al. | 297/256.12 |
| 7,731,284 | B2* | 6/2010 | Lhomme et al. | 297/256.12 |
| 7,753,444 | B2* | 7/2010 | Vallentin | 297/256.12 |
| 8,702,169 | B2* | 4/2014 | Abadilla et al. | 297/256.12 |

FOREIGN PATENT DOCUMENTS

| | | |
|---|---|---|
| DE | 19744978 A1 | 4/1999 |
| EP | 1625967 A1 | 2/2006 |
| EP | 1625968 A1 | 2/2006 |
| EP | 1894770 A1 | 3/2008 |
| EP | 2295287 A1 | 3/2011 |

OTHER PUBLICATIONS

PCT International Search Report and Written Opinion completed by the ISA/EP on Jul. 2, 2012 and issued in connection with PCT/EP2012/057862.
English Translation of the International Preliminary Report on Patentability issued in connection with PCT/EP2012/057862.

* cited by examiner

*Primary Examiner* — Philip Gabler
(74) *Attorney, Agent, or Firm* — Barnes & Thornburg LLP

(57) ABSTRACT

A child car seat includes a base to be positioned on the seat section of a vehicle seat and a seat body pivotably mounted between a forward facing travel position, a rear facing travel position, and at least one right or left arranging position.

18 Claims, 13 Drawing Sheets

SELF-PIVOTING CHILD CAR SEAT TO BE FITTED TO A VEHICLE SEAT

CROSS REFERENCE TO RELATED APPLICATIONS

This application is a U.S. nationalization under 35 U.S.C. §371 of International Application No. PCT/EP2012/057862, filed Apr. 27, 2012, which claims priority to French Application Nos. 1153668 and 1160293, filed Apr. 29, 2011 and Nov. 10, 2011 (respectively).

FIELD OF THE INVENTION

The field of the invention is that of restraint devices. More specifically, the invention relates to child seats, also known as "car seats", to be fitted on passenger seats of vehicles, particularly motor vehicles. It relates more particularly to child seats comprising a base and a seat suitable for pivoting in relation to said base, about a substantially vertical axis.

PRIOR ART

A number of types of pivoting child car seats are known, particularly from the documents EP 1 625 967, EP 1 625 968 and EP 1 894 770. These car seats comprise a base, to be placed in a fixed position on the seat section of the vehicle seat, and a seat body intended to receive the child and suitable for pivoting in relation to the base about a substantially vertical axis. Such pivoting enables the seat body to adopt a position for arranging the child and a travel position, separate from the arranging position.

To ensure the child's safety in the event of a vehicle accident, the seat body must be secured in the travel position when the vehicle is moving. It is also necessary to prevent, during vehicle movement, the seat body from moving to an unsuitable position, for example facing the other passengers of the rear passenger seat of the vehicle. For this, it is necessary to prevent the seat body from being pivoted by the child arranged in the seat or by other passengers of the vehicle, for example by another child sitting next to the car seat.

Furthermore, car seats suitable for adopting two separate travel positions, the first being a "forward facing" position and the second being a "rear facing" position, are known. A car suitable for these two travel positions is for example disclosed by the document EP 2 080 664. In this case, each of the two travel positions is adapted to the child's age or weight (typically "rear facing" for children weighing less than a predefined threshold, "forward facing" above this threshold). In seats offering arranging positions, the seat body is situated, in such an arranging position, substantially 90° from the two travel positions. There is thus a significant risk of the adult arranging the child being tempted, inadvertently or out of habit, to position the child in an unsuitable travel position for the child's age.

For example, if accustomed to positioning the child in a rear facing position for a number of months, the adult may instinctively return the seat body to this position, even though the child's weight now requires a "forward facing" position. Conversely, for example if the "forward facing" position is deemed to be more natural, the adult may inadvertently place the child in this position, although the child's weight would require a "rear facing" position.

Finally, in some cases, the top of the back section of the seat body is connected to the base or to the back section of the vehicle by a "top tether" strap. Pivoting a car seat should not allow this strap to wind around the seat body, and particularly, should not allow same to wind around the child's head, following improper use.

A car seat wherein the car body is pivoting can thus create numerous opportunities for improper use by the adult arranging the child, by the child him/herself or by a third party, giving rise to unacceptable risks for the child's safety.

Aims of the Invention

The aim of the present invention is that of remedying at least some of these drawbacks of the prior art.

In particular, the aim of the present invention is, according to at least one embodiment, that of providing a child car seat wherein the seat body is pivoting, suitable for adopting two child travel positions ("rear facing" and "forward facing") and at least one arranging position (facing a vehicle door), wherein the risk of improper use affecting the child's safety is reduced.

In particular, one aim of the invention is, according to at least one embodiment, that of providing such a seat suitable for adopting a plurality of travel positions, and particularly a forward facing travel position and a rear facing travel position, under satisfactory safety conditions.

A further aim of the invention is, according to at least one embodiment, that of providing such a seat wherein the risk of pivoting the seat body to an unsuitable position when the vehicle is moving is reduced.

As a general rule, the aim of the present invention is that of reducing the risk of improper use of the seat liable to affect the safety of the child arranged therein and the arrangement of the child in a suitable position, particularly due to the child's age.

DESCRIPTION OF THE INVENTION

These aims, along with further aims which will emerge more clearly hereinafter, are achieved using a child car seat, comprising a base to be positioned on the seat section of a vehicle seat and a seat body pivotably mounted on said base, about a substantially vertical axis, so as to be suitable for adopting:
- at least two travel positions, one wherein the seat body is facing the front of the vehicle and the other wherein the seat body is facing the rear of the vehicle,
- at least one right arranging position, and/or one left arranging position, wherein the seat body is facing, respectively, the right and the left of the vehicle, the car seat comprising means for selecting one of said travel positions, such that, from one of said arranging positions, said seat body can only be moved to the selected travel position.

Preferentially, the car seat comprises, for each arranging position, means for limiting the pivoting of the seat body over a first angular range including the travel position wherein the seat body is facing the front of the vehicle and at least one of said arranging positions, or over a second angular range including the travel position wherein the seat body is facing the rear of the vehicle and at least one of said arranging positions.

In this way, when the seat body is in a travel position, forward facing or rear facing, the user can pivot the seat to a position for use. On the other hand, the user cannot continue to pivot to the other travel position, which could be unsuitable for the child, without actuating specific pivoting limiting means. These limiting means thus make it possible to prevent one configuration from being changed to another under unsuitable conditions.

Advantageously, the child car seat comprises at least one selector allowing the user to select the angular zone to which the pivoting of the seat body is limited, said selector being connected to said seat body pivoting limiting means via return means, such that said selector can be set to a selection position corresponding to an angular zone when said seat body is not in said angular zone, the seat body pivoting limiting means limiting the position of the seat body to this angular zone once said seat body enters said angular zone.

In this way, the user can actuate the selector to change the angular zone wherein the seat body is allowed to pivot, even before the seat body is in the authorised angular zone. Once the seat body is positioned in this angular zone, the limiting is applied.

According to one advantageous embodiment, said pivoting limiting means comprise a substantially horizontal plate wherein a track is marked and a pin is inserted into said track, the plate being rotated in relation to the pin, about the axis of rotation of the seat body, by pivoting the seat body in relation to the base, said pin being movable between at least two positions corresponding to the forward or rear facing travel positions, respectively, and the track being formed such that the pin can only slide in a first portion of the track, when it is in a first position, and only in a second position of the track when it is in a second position.

This embodiment enables simple and effective limiting of the rotation to a given angular range, according to the position of the pin which may be modified by means of a suitable control.

Preferentially, said plate is connected to said seat body, and said pin is borne by the base.

According to one advantageous embodiment, said track is a groove comprising a plurality of interconnected portions, each portion forming an arc of a circle having a separate radius centred on the axis of rotation of the platen.

Preferably, the distance of the pin in relation to the axis of rotation of the seat body may be modified by said selector situated on the base so as to enable the sliding thereof, as required, in one of said groove portions.

Advantageously, said track is a closed track encompassing the axis of rotation of said plate, so as to enable unlimited pivoting of the seat body when the pin is placed in the suitable positions.

According to one advantageous embodiment, the car seat comprises second means for limiting the pivoting of said seat body in relation to said base over an angular range at least equal to 360°.

Advantageously, said second pivoting limiting means comprise a platen and a part for locking this platen, the platen being rotated in relation to the locking part, about the axis of rotation of the seat body, by pivoting the seat body in relation to the base, the locking part being movable between at least two positions:

an idle position wherein it does not impede the rotation of the platen,
at least one locking position wherein it locks the rotation of the platen in one direction,
the platen bearing a lug suitable for switching the locking part from the idle position thereof to the locking position thereof when the pivoting of the platen brings the lug in contact with the locking part, so as to discontinue this pivoting.

Preferably, said locking part can adopt two separate locking positions according to the direction of rotation of the platen bringing the lug of the platen in contact with the locking part, the lug locking the pivoting of the platen, in each of said locking positions, in this direction of rotation.

The locking part may thus be suitable for limiting the rotation of the platen to an angular range of 360°.

Advantageously, said platen is connected to said seat body, and said locking part is borne by the base.

Preferentially, said locking part is a lever pivotably mounted on said base about a parallel axis in relation to the axis of rotation of the seat body, and suitable for engaging with the edge of said platen.

Advantageously, said substantially horizontal plate forms said platen.

Preferably, said base comprising a system for attaching to the vehicle seat comprising Isofix clips.

According to one particular embodiment of the invention, said child car seat comprises means for locking the pivoting of the seat body in relation to the base in each of said travel positions and two pivoting unlocking controls, suitable for enabling the pivoting of the seat body from said travel position to, respectively, a right arranging position and a left arranging position, the car seat also comprising means for selecting one of said controls, suitable for moving between a first position wherein it is suitable for actuating a first of said controls and prevents the actuation of the second of said controls and a second position wherein it is suitable for actuating the second of said controls and prevents the actuation of the first of said controls.

These selection means, which may also be used on a car seat regardless of the pivoting limiting features, makes it possible to prevent the control for pivoting the seat body from being easily accessible by a user positioned in the vehicle, and thus prevents improper use of the pivoting system. It also makes it possible to reduce the risk of the seat body being pivoted into an unsuitable travel position for a child.

Preferentially, the movable selection means comprise a selection plate suitable for moving between a first position wherein it comes into contact with and/or covers at least partially the second of said controls to prevent the actuation thereof and is at a distance from the first of said controls, and a second position wherein it comes into contact with and/or covers at least partially the first of said controls to prevent the actuation thereof and is at a distance from the second of said controls.

Such a selection plate, which may advantageously be placed on the front of the car seat, enables easy selection of the control suitable for actuation.

Advantageously, said selection plate is suitable for moving by sliding between said first and second positions.

Preferably, said selection plate comprises a gripping zone allowing the user to move same between said first and second positions.

According to one preferential embodiment, said controls for unlocking the pivoting of the position and said movable selection means are placed on the front of an element of the car seat pivotably connected to the seat body.

The accessible pivoting control may thus be selected relatively easily by the user.

Advantageously, the controls for unlocking the pivoting of the position act, when actuated, as handles for rotating the seat body by the user.

In this way, these controls are suitable for unlocking and rotating the seat in one action by the user.

Preferentially, each of said controls is actuated by pressing on one face of said control, said movable selection means preventing access to said face, in any of the positions, to prevent the actuation of said control.

Advantageously, the car seat is suitable for two travel positions, one wherein the seat body is facing the front of the vehicle and the other wherein the seat body is facing the rear of the vehicle, said controls for unlocking the pivoting being suitable for pivoting the seat body from either of said travel positions to the right arranging position thereof and the left arranging position thereof, respectively.

A single pivoting unlocking control system may thus be used in the various embodiments.

LIST OF FIGURES

Further features and advantages of the invention will emerge on reading the following description of embodiments of the invention, given for illustrative and non-limiting purposes and accompanied by the figures, wherein.

DESCRIPTION OF EMBODIMENTS OF THE INVENTION

Principle of the Invention

The invention thus relates to a child car seat, comprising a rotatable seat body, so as to be able to adopt two travel positions, wherein the child is rear facing (i.e. facing the rear of the vehicle) or forward facing (i.e. facing the front of the vehicle), and also at least one (generally two) position for arranging the child, facing a door of the vehicle (i.e. substantially 90° from one of the travel positions).

The rear facing or forward facing travel positions should not be selected at random or according to the wishes of the child or the person arranging the child. Indeed, the child's safety implies, particularly according to the child's weight, use of the suitable position, the seat having been developed and designed for this purpose. However, there is a risk, after arranging the child, with the seat body in an arranging position, of the person arranging the child making a mistake, and returning, out of habit or inadvertently, the seat body to the incorrect position, in respect of the child's weight.

To prevent this risk, the invention envisages selection means, suitable for selecting the suitable travel position. Typically, while the child's weight is below a predefined threshold, the rear facing position is selected. When the child has grown, and his/her weight exceeds this threshold, the forward facing position is selected (in this way, as a general rule, two selections are made during the time of use by a child).

These selection means require, to return the seat body to the travel position, a return to the selected travel position, and prevent access to the other travel position.

An example of a pivoting seat using the invention (see next paragraph) and a number of optional aspects of such a seat are described hereinafter. Embodiments for selecting a travel position according to the invention are described more specifically from the paragraph entitled "Front-rear locking".

Principle of Pivoting Seat

Figure 1:
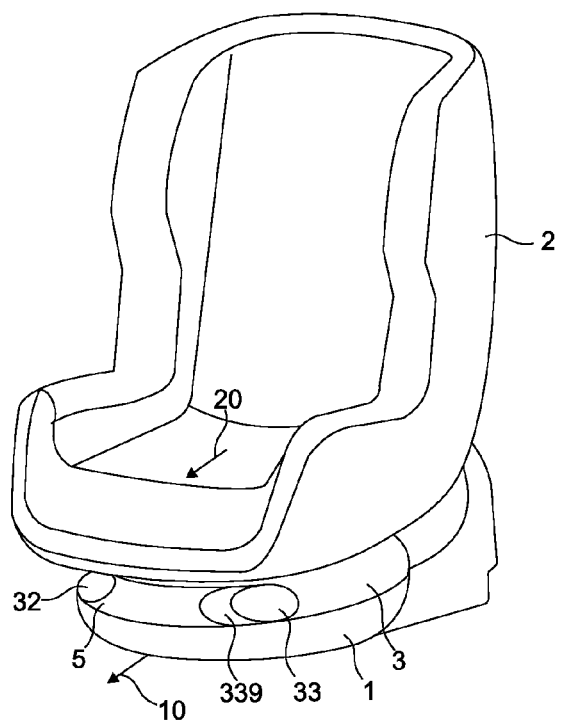
FIG. 1 is a perspective view of a car seat according to one embodiment of the invention.

FIG. 1 shows a perspective view of a car seat according to one embodiment of the invention. This car seat comprises a base 1 intended to be positioned on a vehicle passenger seat. A rear bearing element 15 of this base may be provided, and have a suitable shape for bearing against the backrest of the vehicle seat. Advantageously, this base may be attached to the vehicle seat via a system of clips locking onto corresponding hooks connected to the vehicle structure. This attachment system, which is neither represented nor described in the present application, is standardised and known as an "Isofix attachment system".

The car seat may also implement a anti-tipping strap (or "top tether") restraint system for connecting the upper part of the rear bearing element 15 to a vehicle anchoring point. In particular, it may consist of a car seat as described in the joint patent application, entitled "Child car seat, to be fitted in a vehicle seat", filed on the same day as the present application and incorporated by way of reference.

The car seat comprises a seat body 2 wherein a child may be arranged, which is fixedly mounted on a pivoting support 3 which is assembled in a pivoting manner on the base 1. In this way, the seat body 2 can pivot in relation to the base 1, about a substantially vertical axis.

Pivoting Unlocking Handles

In FIGS. 2 to 5, the base 1 and the pivoting support 3 are shown without the seat body 2, to allow a clearer view of the pivoting support 3. This pivoting support 3 comprises, on the top surface thereof, four slots 31 provided for screws for securing the seat body 2.

Figure 2:
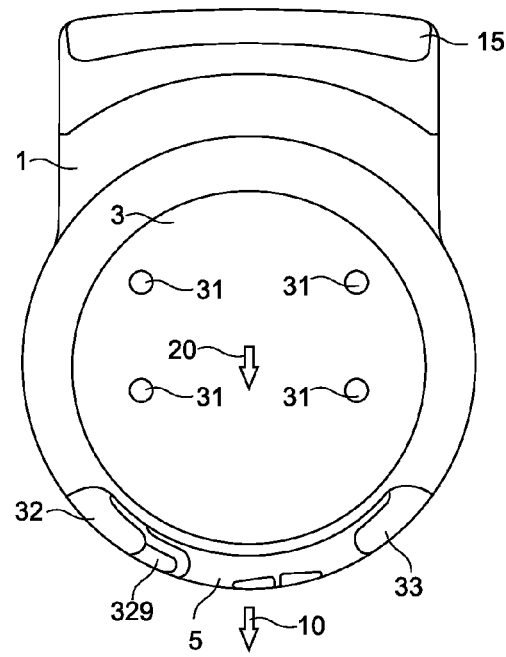
FIG. 2 is a top view of the base and the pivoting support of the car seat in FIG. 1 in a first embodiment of the pivoting locking system.
Figure 3:
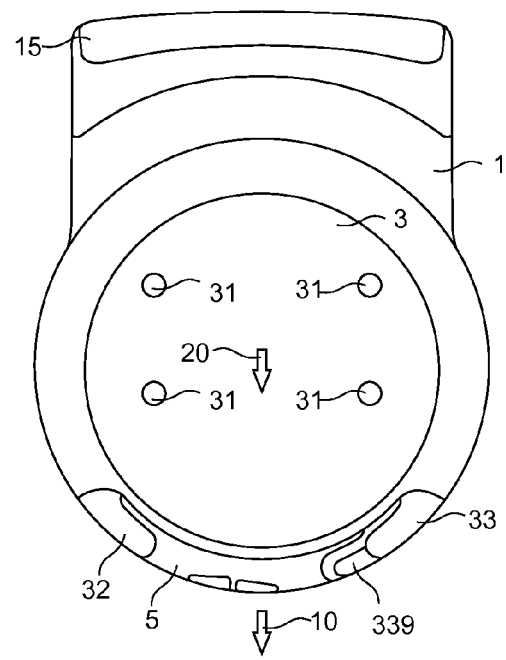
FIG. 3 is a top view of the base and the pivoting support of the car seat in FIG. 1 in a second embodiment of the pivoting locking system.

In the "forward facing" travel position of the car seat, which is particularly shown in FIGS. 1 to 3, the angular position of the pivoting support 3 in relation to the base 1 is locked by a rotation locking system. In the embodiment shown, a right pivoting unlocking handle 32 and a left pivoting unlocking handle 33 are provided on the portion of the pivoting support 3 facing the front of the seat body 2. These two handles are suitable for unlocking the angular position of the pivoting support 3 in relation to the base 1, to enable the pivoting of the seat body 2.

It should be noted that those skilled in the art would be readily able to envisage other systems for locking and unlocking the angular position of the pivoting support in relation to the base than those of the embodiments described in the present application, without leaving the scope of the invention.

Figure 4:
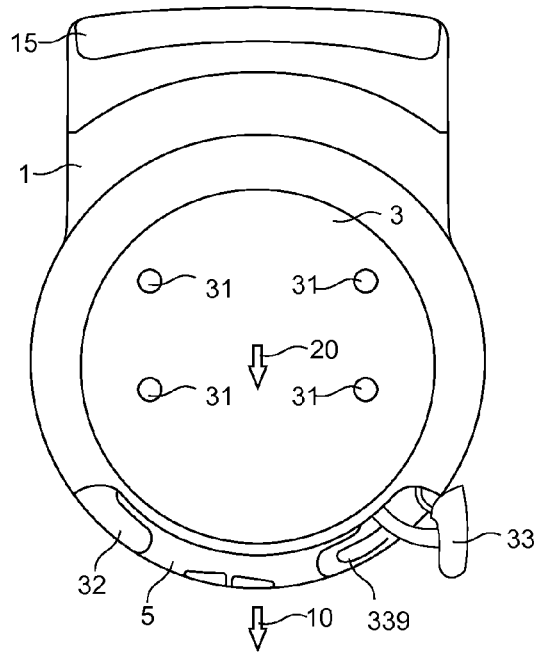
FIG. 4 is a top view of the base and the pivoting support of the car seat in FIG. 1 in a third embodiment of the pivoting locking system.
Figure 5:
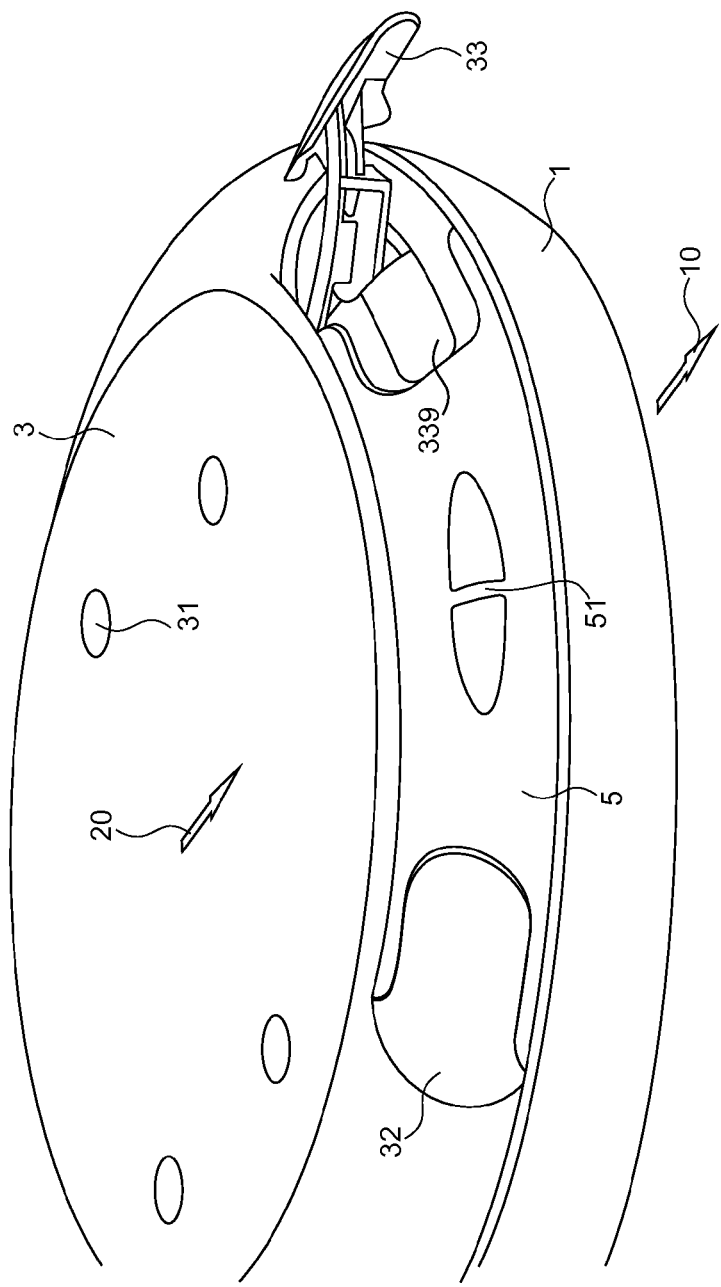
FIG. 5 is a perspective view of the base and the pivoting support of the car seat in FIG. 1, in the embodiment in FIG. 4.

In FIGS. 4 and 5, the left pivoting unlocking handle 33 is shown actuated. As shown in these figures, the handle is actuated by pulling forwards, pivoting the handle about a substantially vertical axis. This actuation thus requires the user to insert his/her fingers under the handle. When the user pulls the left handle 33 to the actuated position thereof shown in FIGS. 4 and 5, the continuation of the movement thereof to the left causes the rotation of the pivoting support 3 and the seat body 2. In this way, in this embodiment, the left handle 33 is suitable for successively unlocking the seat body pivoting locking system and controlling (at least partially) this pivoting.

Operating Mode of Pivoting Unlocking Handle

Figure 6:
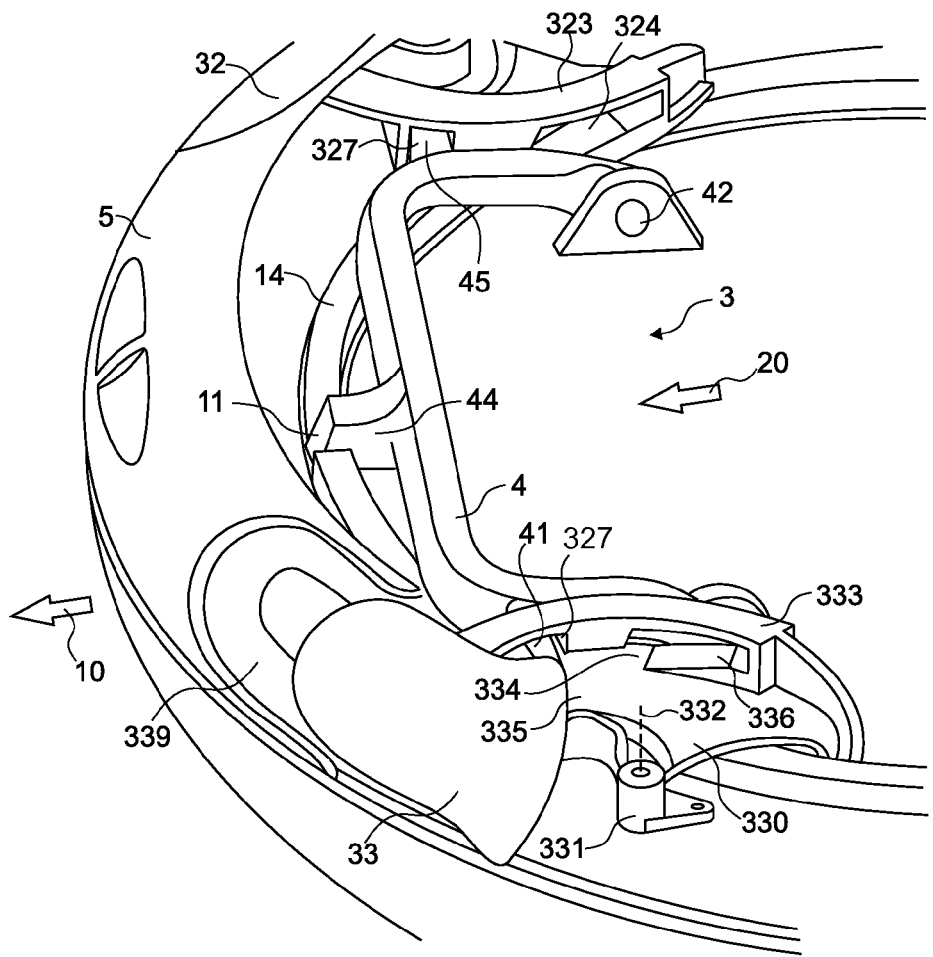
FIG. 6 is an exploded perspective view showing the base and a portion of the pivoting support of the car seat in FIG. 1, in the embodiment in FIG. 3.
Figure 7:
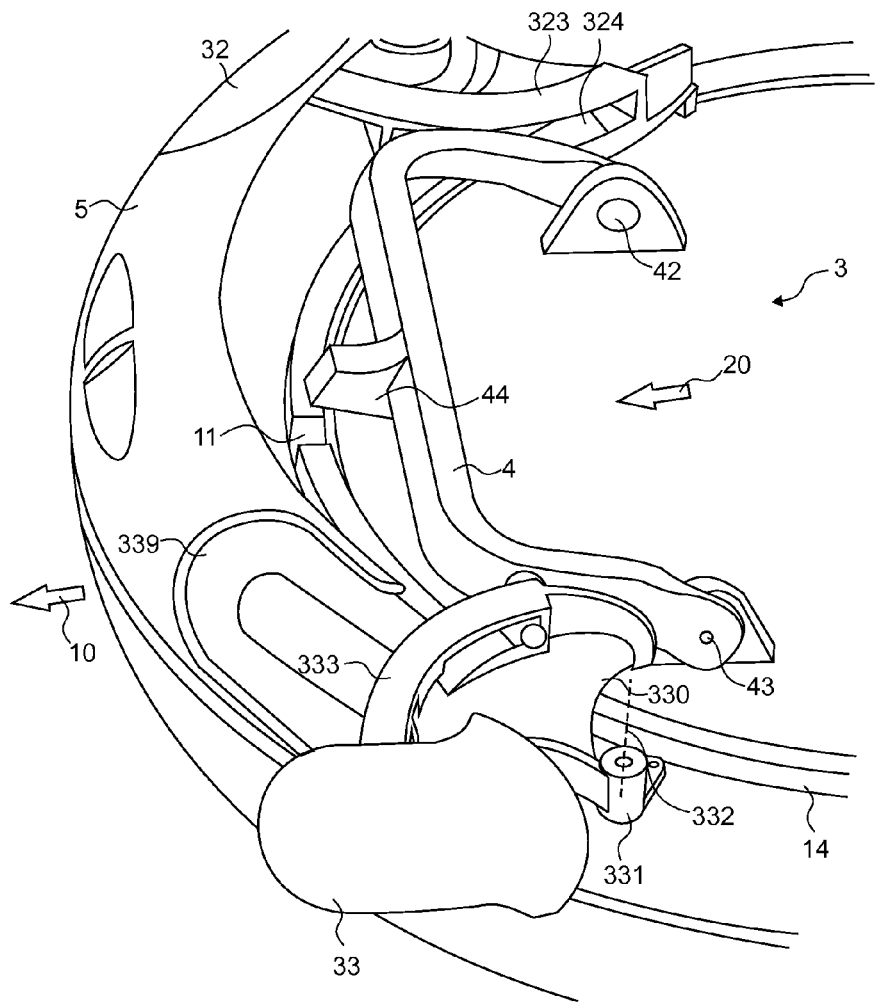
FIG. 7 is an exploded perspective view showing the base and a portion of the pivoting support of the car seat in FIG. 1, in the embodiment in FIG. 4.

FIGS. 6 and 7, showing the base 1 and a portion of the parts forming the pivoting support 3, show the operating mode of the left unlocking handle 33 according to a possible embodiment of the invention.

As shown in these figures, the handle 33 is attached to an arm 330, bearing a hinge 331 for pivoting the arm 330 and thus the handle 33 in relation to the pivoting support 3 about a substantially vertical axis 332. The arm 330 also bears a ramp 333 acting as a reinforcement which, in a horizontal plane, forms an arc of a circle centred on the axis 332. This ramp 333 has a groove 334 opening onto the periphery thereof, wherein a horizontal block 41 of a locking lever 4 is inserted.

The shape of the groove 334 is such that it requires the block 41 to have a height dependent on the angular position of the handle 33. In this way, when the handle 33 is not actuated, or during the start of the actuation movement, the block 41 bears on the plane surface 335 of the groove 334. During this first phase of the movement of the handle 33, the height of the block 41 does not vary. When the actuation movement of the handle 33 continues, the block 41 comes into contact with the inclined surface 336 of the groove 334. The actuation movement of the handle 33 then raises the block 41, to the position shown in FIG. 7, wherein the block 41 is in the highest position thereof.

Locking Lever 4

The block 41 is part of a locking lever 4 having a general U shape. At both ends of the arms of the U shape, this locking lever 4 is assembled with the pivoting support 3 via coaxial hinges 42 and 43. At the centre of the portion thereof forming the base of the U shape, the lever 4 bears a catch 44.

The movement of the handle 33 between the non-actuated position thereof and the actuated position thereof causes a variation in the height of the block 41. As this block 41 is borne by an arm of the lever 4, the actuation movement of the handle 33 causes upward pivoting of this level 4 about these hinges 42 and 43.

In the idle position of the handle 33 shown in FIG. 6, the lever 4 is in the lower position and the catch 44 thereof is inserted into a notch 11 provided in a rib 14 of the base 1. The engagement of the catch 44 with the notch 11 locks the pivoting of the pivoting support 3 in relation to the base 1.

When the actuation of the handle 33 causes upward pivoting of the lever 4, as shown in FIG. 7, the catch 44 is raised and is disengaged from the notch 11. The pivoting of the pivoting support 3 in relation to the base 1 is then no longer locked, and the user, by continuing to pull the handle 33, can pivot the pivoting support 3 and the seat body attached thereto to the left.

The pivoting locking system particularly comprising the handles 33 and 32, the lever 4 and the rib 14 is symmetric in relation to a vertical plane acting as the plane of symmetry of the seat body 2. The description given above of the left handles thus applies, mutatis mutandis, to the right handle. In particular, the lever 4 has, on the right arm thereof, a symmetric block 45 in relation to the block 41, inserted into a groove 324 of a ramp 323 connected to the handle 32.

It should be noted that the grooves 324 and 334 each have a notch, respectively 327 and 337, suitable for raising the block 41 or 45 inserted therein when the handle is in the non-actuated position thereof. Indeed, actuating only one of the handles 32 or 33 makes it possible to raise the lever 4, with the other handle remaining in the idle position thereof. The engagement of the block 41 or 45 in the corresponding notch then prevents the actuation of the second handle, until the lever has returned to the lower position thereof.

It should be noted that return means, not shown, may advantageously hold the lever 4 in the lower position thereof when none of the handles 32 and 33 is actuated. Similarly, suitable return means may return the handles 32 and 33 to the non-actuated positions thereof, particularly when the seat body reaches the "forward facing" position thereof.

Front Paddle

The handles 32 and 33 are thus actuated by pulling same forwards. This actuation requires the ability to bear on the concealed face of each of these handles. According to one advantageous embodiment of the invention, a selection plate 5 is mounted on the pivoting support 3, between the handles 32 and 33, so as to slide along the pivoting support 3.

It may thus adopt a first position shown in FIG. 2, wherein it comes into contact with the edge of the left handle 33 and is at a distance from the right handle 32. In this first position, the selection plate 5 reveals a recess 329 in the pivoting support 3, in the vicinity of the handle 32, making it possible to insert a finger on the rear face of the handle 32 so as to actuate same. In one alternative of this embodiment, the selection plate 5 may in this first position overlap slightly with the edge of the left handle 33 so as to prevent the actuation thereof.

The selection plate 5 may also adopt a second position particularly shown in FIGS. 1 and 3 to 7, wherein it comes into contact with the edge of the right handle 32, covering the recess 329 and is at a distance from the left handle 33. In this second position, the selection plate 5 reveals a recess 339 in the pivoting support 3, in the vicinity of the handle 33, making it possible to insert a finger on the rear face of the handle 33 so as to actuate same. In one alternative of this embodiment, the selection plate 5 may in this first position overlap slightly with the edge of the left handle 33 so as to prevent the actuation thereof.

The selection plate 5 has a gripping zone 51 for facilitating the sliding thereof between the first position and second position thereof. In this way, the selection plate 5 is suitable, in one of the positions thereof, for actuating the handle 32 to rotate the seat to the right and, in the other position thereof, actuating the handle 33 to rotate the seat to the left.

Pivoting the Seat

In this way, when the user wishes to pivot the seat from the "forward facing" position thereof to a position facing the left, he/she actuates the selection plate 5 to place same in the second position thereof, and then pulls the left handle 33 which pivots to the unlocking position thereof. When the user continues to pull this handle, this causes the pivoting support 3, and the seat body 2 attached thereto, to pivot to the left.

Similarly, when the user wishes to pivot the seat from the "forward facing" position thereof to a position facing the right, he/she actuates the selection plate 5 to place same in the first position thereof, and then pulls the right handle 32 which pivots to the unlocking position thereof. When the user continues to pull this handle, this causes the pivoting support 3, and the seat body 2 attached thereto, to pivot to the right.

The user, when arranging the seat in the vehicle, naturally positions the selection plate 5 so as to be able to rotate the seat body to the nearest door easily. In this way, he/she positions the selection plate in the first positions thereof if the seat is arranged next to the right door of the vehicle, and in the second position thereof if the seat is arranged next to the left door. Consequently, the selection plate 5 makes it very difficult for a passenger seated next to the car seat, seeking for example to turn the child arranged in the car seat to face him/her, to unlock the pivoting of the seat body. This plate particularly makes it possible to prevent this improper use of the car seat, which is dangerous for the child.

It should be noted that the rib 14 may comprise a second notch diametrically opposite the notch 11, in relation to the pivoting axis of the pivoting support. The catch 44 may be engaged in this second notch when the pivoting support 3, and the seat body 2 attached thereto, are facing the rear, in the "rear facing" position. In this way, the same locking system can be used for locking the seat in the "forward facing" position and in the "rear facing" position.

First Alternative Embodiment

Figure 14:
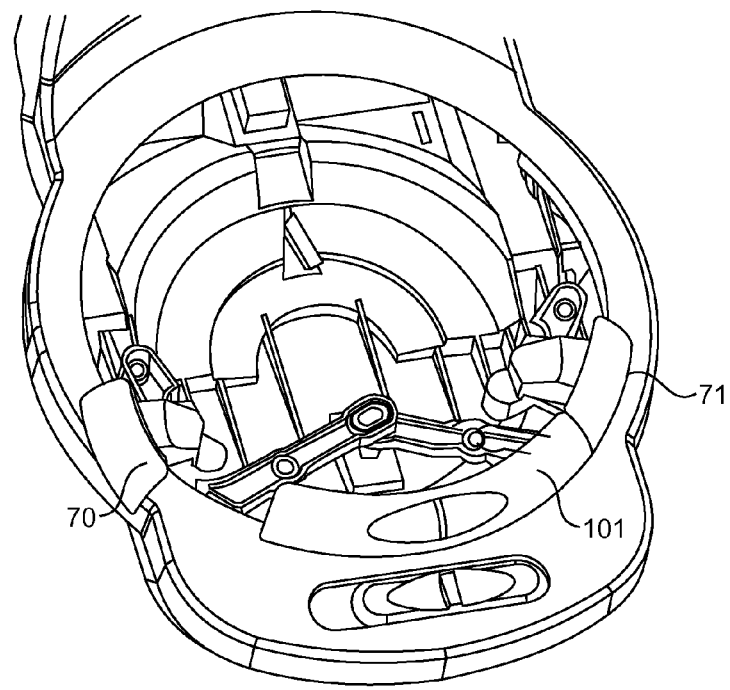
FIG. 14 is a simplified view of the base and some elements of the pivoting support platen of a car seat according to a first alternative embodiment of the invention.
Figure 15:
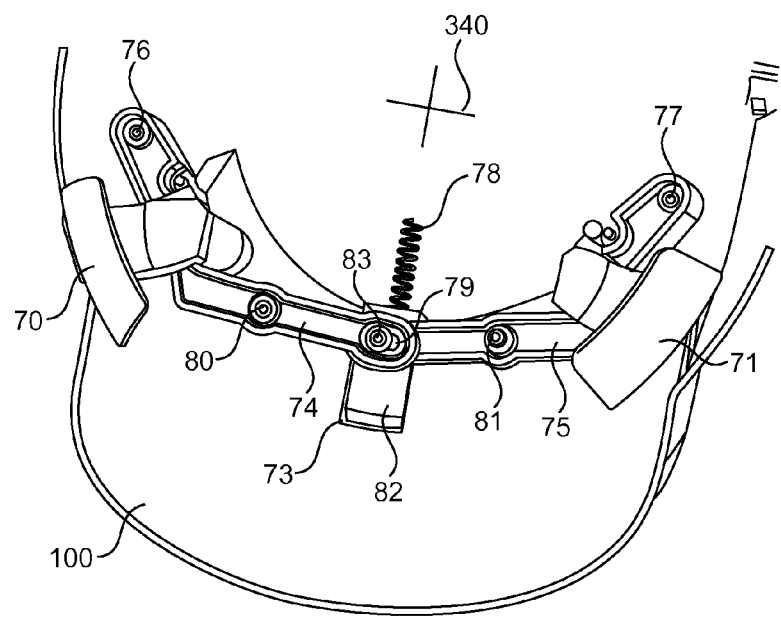
FIGS. 15 and 16 are simplified top views of the base and some elements of the pivoting support platen in FIG. 14, in the "forward facing" locking position and unlocking position, respectively.
Figure 16:
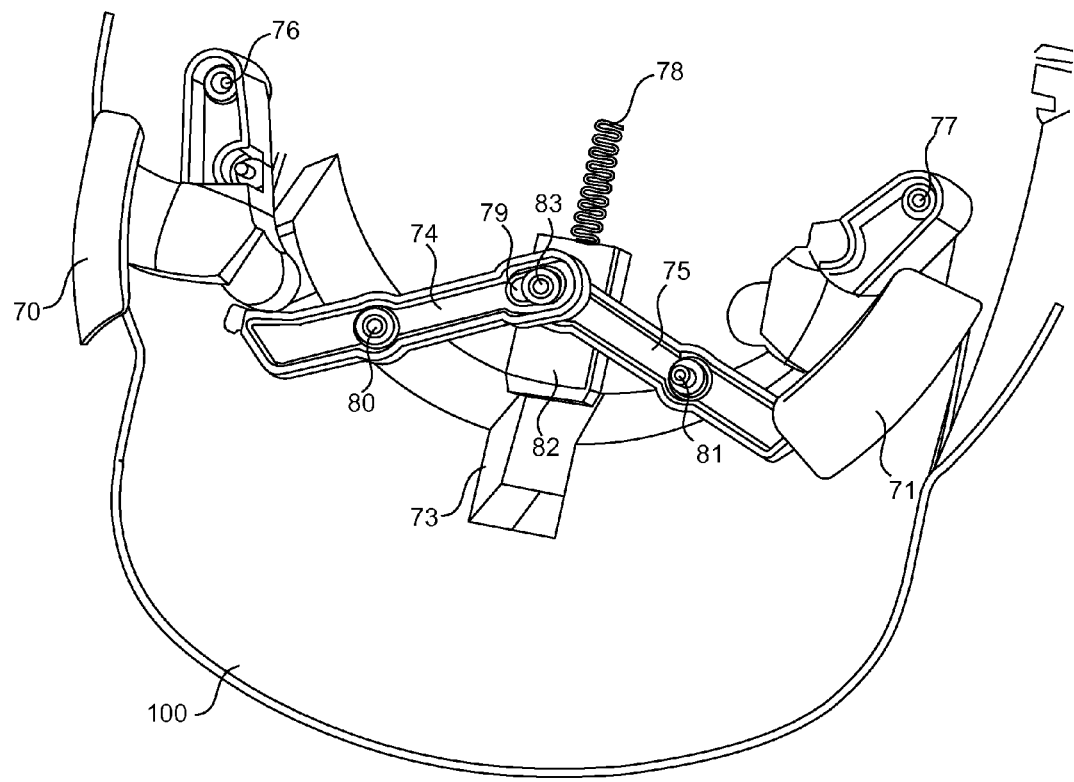

According to a first alternative of this embodiment, illustrated in FIGS. 14 to 16, the handles 32 and 33 and the pivoting locking lever system 4 may be replaced by another system for locking the "forward facing" and "rear facing" positions.

As illustrated in the general FIG. 14, this system comprises a base 100 bearing a pivoting support for the seat body 2 (the pivoting support and the seat body 2 are not shown in this figure and in the following two FIGS. 15 and 16 for clarity purposes). This pivoting support particularly comprises a selection plate 101 and two handles 70 and 71.

The selection plate 101 plays a similar role to the selection plate 5 described above. Indeed, it enables, by sliding to the right or left side, the actuation of one of the two handles 70 or 71, while rendering the other inoperative.

FIGS. 15 and 16 describe in more detail the locking system situated at the interface of the base 100 and the pivoting support. It comprises a set of mutually interacting elements described hereinafter.

Of these elements, two handles 70 and 71 can pivot about a substantially vertical axis of rotation defined by hinges 76 and 77 placed at one of the respective ends thereof and attached to the pivoting support. The two handles 70 and 71 respectively have a contact surface with the so-called distal ends of two levers 74 and 75 also forming part of the pivoting support.

These two levers 74 and 75 are pivotably mounted about attachment points, 80 and 81, respectively. They comprise a so-called proximal end, near the median plane of the base, and an opposite distal end. The two ends are each drilled with an oblong hole (79 for one, not shown for the other) enabling a substantially vertical axis of rotation 83 to pass through these holes. This axis of rotation 83 is attached to a catch 82 in the form of a straight block slidably mounted on the pivoting support.

This catch 82 can make a substantially horizontal translational movement in the "forward"-"rear" direction in relation to the pivoting support, enabling same to be engaged in a strike plate 73, to which it is pushed by a spring 78.

This strike plate 73 and a further identical strike plate (not shown) are situated at the front and rear inside the base 100. They have substantially the size and shape of the catch 82 and may each receive same in alternation.

When the unlocking system is in "idle" mode, or the locking position, the seat body 2 is in the "forward facing" or "rear facing" position, locked to the base 100. As shown in FIG. 15, the seat body 2, not shown for clarity purposes, is in the "forward facing" position. The spring 78 is slack and pushes the catch 82 into the strike plate 73. By means of the intermediate action of both levers 74 and 75, the catch 82 holds the two handles against the base 100.

When the handle 70 is actuated by the user, the unlocking system switches to "actuated" mode (i.e. moved by the user), or unlocking position, as shown in FIG. 16. The handle 70 rotates about the hinge 76 thereof whereby the contact surface thereof pushes the distal end of the lever 74 so as to pivot the lever wherein the proximal end then induces a translational movement of the catch out of the strike plate 73. Consequently, the spring 78 is compressed by the catch 82. Moreover, the handle 71, remaining in a non-actuated position (wherein it may be held by a return spring not shown), loses contact with the lever 75. The user can then rotate the pivoting support on the axis 340 thereof.

As a general rule, this unlocking of the pivoting support in relation to the base 100 enables the user to choose between a "forward facing" or "rear facing" position of the seat body 2. In FIG. 16, the initial position is "forward facing". The handle 70 being pulled by the user, it this causes the seat body 2 to pivot in the clockwise direction to the other idle position or locking position, in this case, the "rear facing" position. After releasing the handle 70, the spring 78 can slacken and push the catch 82 into the second strike plate of the base 100, locking the seat body 2 again.

Similarly, actuating the handle 71 has a similar effect to that of the handle 70 resulting in the seat body 2 rotating in the opposite direction.

For a return to the initial "forward facing" position, it is simply necessary to actuate one of the two handles 70 or 71. The seat body 2 is unlocked from the base 100 and may be positioned in one of the two positions selected by the user.

Second Alternative Embodiment

According to a second alternative of this embodiment, the pivoting rotary support comprises a pivoting rotary ring, intended to bear the seat body 2, and a system for locking the "forward facing" or "rear facing" positions.

Figure 17:
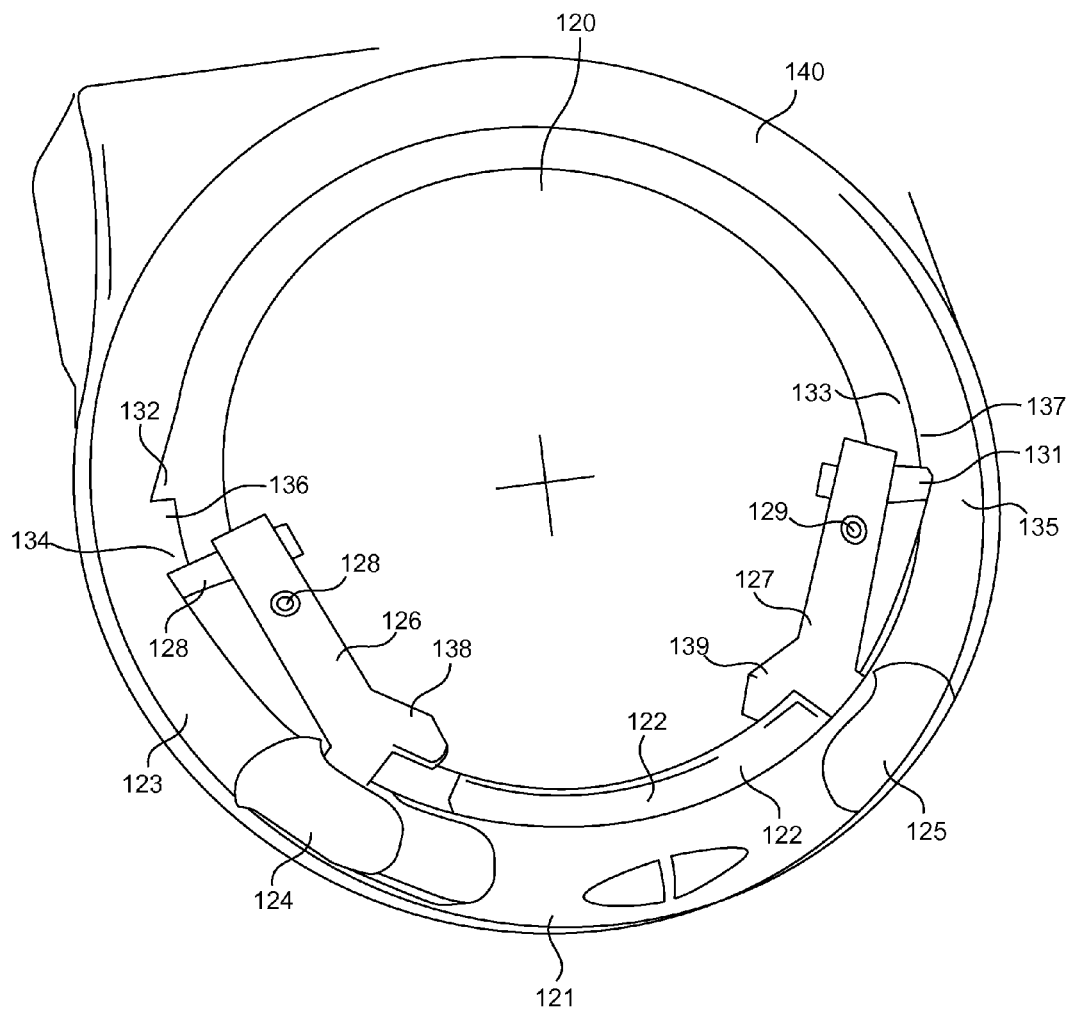
FIG. 17 is a simplified view of the base and some elements of the pivoting support platen of a car seat according to a second alternative embodiment of the invention.

As illustrated in FIG. 17, the base 120 supports a pivoting ring 123 in turn bearing a selection paddle 121 and two handles 124 and 125.

The base 120 has, under the pivoting ring 123, a quasi-circular inner edge 140 (shown as a dotted line in FIG. 17). This edge 140 has two diametrically opposed side locking zones. Each of each locking zones comprises two ramps, respectively 132 and 134 for one of the sides and 133 and 135 for the opposite side. These ramps 132, 133, 134 and 135 deviate from the original diameter of the inner edge, to each reach a projection 136 and 137 acting as abutments. The inner edge 140 thus forms a track whereon two tabs 130 and 131, borne by the pivoting ring 123 and acting as locks, come into contact.

Each of these two tabs 130 and 131 is retractable respectively inside levers 126 and 127 mounted on the pivoting ring 123. They may in turn pivot respectively about two substantially vertical axes 128 and 129. One of the ends of the levers 126 and 127 is in a Y shape. One of the arms of each Y is connected respectively to the handles 124 and 125. The two other arms of the Y shapes, 138 and 139, each have a contact surface with a locking portion 122 rigidly connected to the selection plate 121. This locking portion 122 may slide between these two contact surfaces.

The handles 124 and 125, attached to the levers 126 and 127, are, by default, positioned against the base 120 and alternatively locked by the locking portion 122 according to the position of the selection plate 121.

The pivoting ring 123, supporting the seat body 2, is, by default, locked in one of the "forward facing" or "rear facing" positions. The position shown in FIG. 17 is "forward facing". The selection paddle is moved to the left thus locking the handle 125 and the lever 127. The two tabs 130 and 131 are inserted into the ends of the ramps 134 and 135 against the projections 136 and 137 thus acting as locks. The ring 123 thus cannot be rotated either in one direction or the other without specific action by the user.

In order to be able to unlock the pivoting ring 123 from the "forward facing position" and set same to the "rear facing" position, the user needs to hold and pull the handle 124. This results in pivoting of the lever 138 on the axis 128. The tab 130 moves away from the ramp 128 and thus no longer locks the rotation of the ring 123 in relation to the base 120. When the ring is rotated in the clockwise direction, the tab 130 can thus reach the ramp 132. In parallel, the tab 131 follows the ramp 135, thus forcing same to retract into the lever 127. The ring 123 can continue to rotate until the tab 135 engages on the ramp 134, progressively comes out of the lever 127 and comes into contact with the abutment 136. In the following movement, if the user releases the handle 124, the tab 130 can be engaged on the ramp 132, retract along the track until it can come out of the lever 126 and is engaged on the ramp 133 where it ends by abutting on the projection 137. The system, in the "rear facing" position, is again locked.

Referring to the illustration in FIG. 17, the user can decide to slide the selection paddle 121 to the left, thus releasing the handle 125. By actuating this handle 125, the user can rotate the ring 123 and as such the seat body 2 in the opposite direction to reach the "rear facing" position. Similarly, the "rear facing" position may be unlocked by actuating one of the handles selected and enable the movement of the seat body to the "forward facing" position.

Front-rear Locking

According to the invention, the car seat comprises means for limiting the pivoting of the seat body to a first angular zone when the seat body is facing the front of the vehicle, and to a second angular zone when the seat body is facing the rear of the vehicle. Two possible embodiments of this feature of the invention are described hereinafter.

Figure 8:
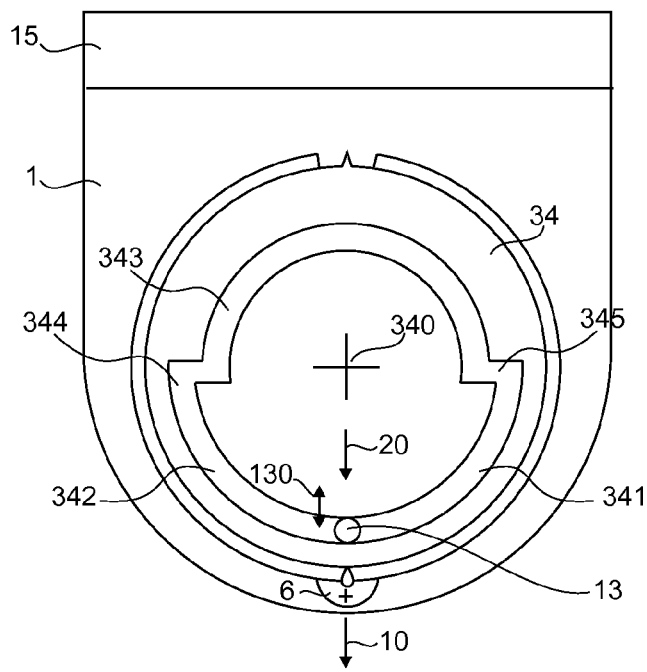
FIG. 8 is a simplified top view of the base and a pivoting support platen when the seat body is forward facing.

FIG. 8 is a schematic top view of a horizontal platen 34 forming part of the pivoting support 3 according to one embodiment of the invention. This platen 34, which is intended to pivot in relation to the base 1 about the axis 340 perpendicular to the plane of the platen 34, comprises a groove 341 encompassing the axis 340. This groove 341 consists of two semi-circular portions, 342 and 343 respectively, centred on the axis 340 and having different diameters, and wherein the respective ends are interconnected by rectilinear portions 344 and 345.

A pin 13, borne by the base 1, is inserted into the groove 341. This pin is slidably movable in relation to the base 1 along the direction shown by the arrow 130. More specifically, a control knob can be used to switch the pin 13 from a forward position wherein it is separated from the axis 340 by a distance corresponding to the radius of the groove portion 342, such that the pin 13 can slide in this groove portion 342, and a rear position wherein it is separated from the axis 340 by a distance corresponding to the radius of the groove portion 343, such that the pin 13 can slide in this groove portion 343.

According to one particular embodiment of the invention, the control knob (not shown in the figures) is connected to the pin 13 via return means, such as a spring. In this way, the user can switch the control knob from one position to another, by deforming the return means even if the pin 13 cannot change position. On the other hand, once the pin is free to change position, it is driven by the return means to the position corresponding to the position of the control knob.

The embodiment shown in FIG. 8 corresponds to that shown in FIG. 1, wherein the seat body 2 is in the "forward facing" position. From this position, the pivoting support 3 and thus the platen 34 can pivot by a quarter-turn to the right or to the left without the pin 13, sliding in the groove portion 342, impeding this pivoting.

Figure 9:
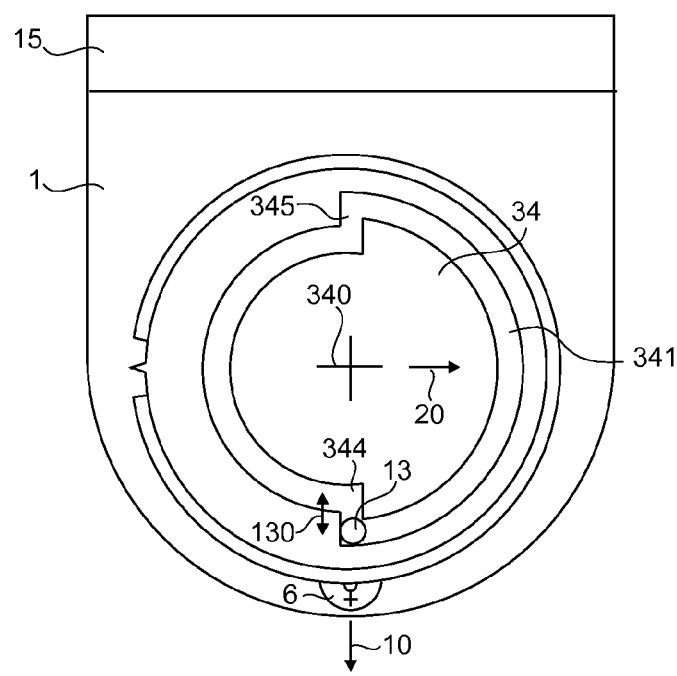
FIG. 9 is a simplified top view of the base and a pivoting support platen when the seat body is facing the left side, in the arranging position, and is free to pivot to the "forward facing" position.

On the other hand, in the position shown in FIG. 9, wherein the seat body 2, and thus the pivoting support 3 and the plate 34, have pivoted by a quarter-turn to the left, the pin 13 abuts against the end of the groove portion 342, and thus locks the rotation of the platen 34, and thus of the pivoting support 3 and seat body 2. To continue this rotation to the "rear facing" position of the seat body 2, it is necessary to actuate the control knob of the pin 13 so as to slide the pin 13 in the groove portion 344, up to the position shown in FIG. 10.

Once the pin 13 is in this position, it can slide freely in the groove portion 343, thus allowing the pivoting of the seat body 2 between the positions perpendicular to the forward facing position and the rear facing position, but can no longer move closer to the "forward facing" position. Obviously, switching from the "forward facing" position to the "rear facing" position by pivoting to the right, or switching from the "rear facing" position to the "forward facing" are performed in a similar manner.

The control knob of the pin 13 is preferably not easily accessible. It may for example be positioned on the face of the base 1 placed on the seat section of the vehicle seat. In this way, the user is not tempted to change the position of this pin 13 until justified by the age of the child to be transported. The seat body 2 can thus only pivot between a single child travel position ("forward facing" or "rear facing", according to the position of this knob 13) and an arranging position, wherein it is rotated by a quarter-turn towards the door.

This locking of rotation by a pin sliding in a groove may be used on a car seat with a pivoting seat body regardless of the other rotation locking or limiting features. It should also be noted that a similar system could be set up with a greater number of groove portions acting as arcs of circles of different diameters, to limit the rotation of the seat body to a defined angular range, for each position of the pin. In some possible embodiments, the groove may not encompass the axis of rotation completely, to limit the full angular range of seat body rotation.

In further possible embodiments, the groove may, on the contrary, encompass the axis of rotation of the seat body completely without being closed, some angular positions optionally being achieved by the seat with two separate pin positions.

Alternative Embodiment for Position Selection

Figure 18:
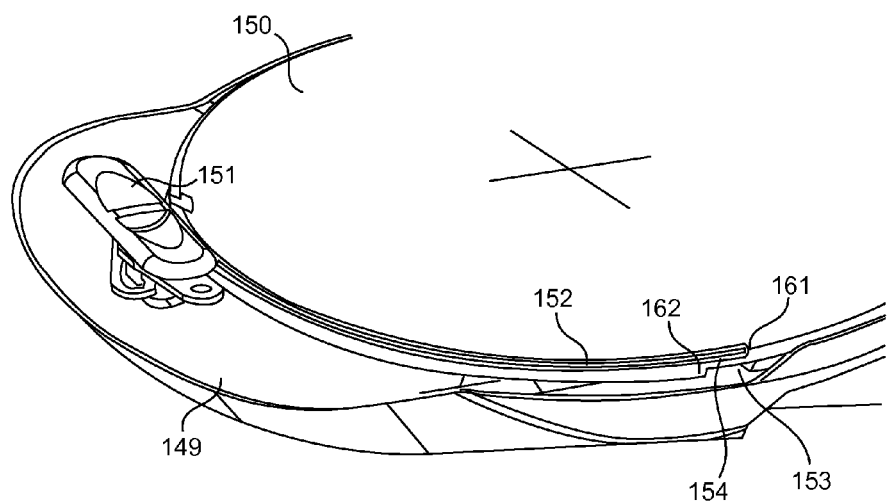
FIG. 18 is a simplified view of the base and some elements of the pivoting support platen of a car seat according to an alternative embodiment of the invention, offering a further method for selecting the "forward facing" or "rear facing" position.
Figure 19:
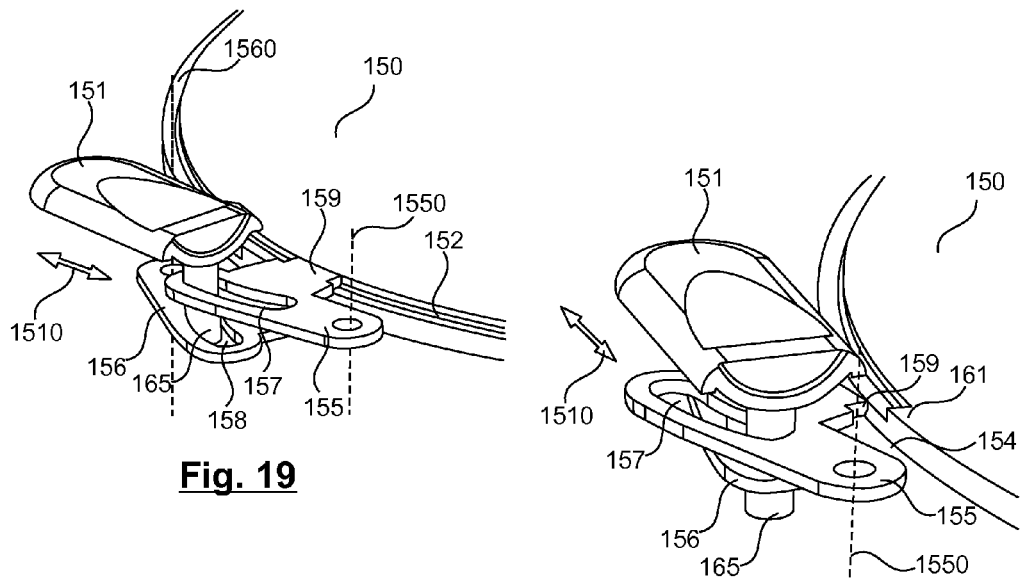
FIGS. 19 and 20 are detailed views of the base and some elements of the pivoting support platen in FIG. 18, in two possible positions.
Figure 20:
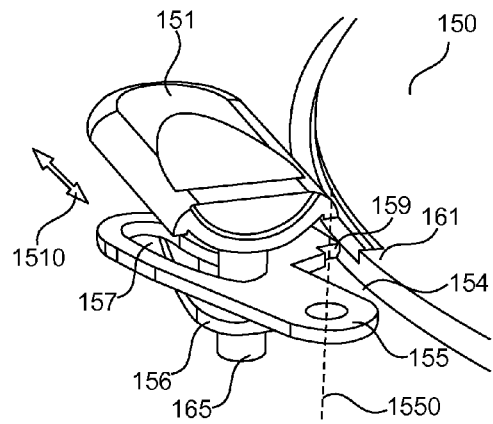

FIGS. 18 to 20 show a possible embodiment of the invention, for selecting a "forward facing" or "rear facing" angular zone. FIG. 18 thus shows the base 149 of a car seat bearing a pivoting platen 150, intended to support the seat body 2 (not shown).

The platen 150 has a disk shape wherein the peripheral edge forms a cylindrical surface. This peripheral edge has two grooves.

An upper groove 152 is created along the ridge between this peripheral edge and the top surface of the platen 150, and covers substantially over half of the periphery. This groove 152 is limited by two abutments, one on the right side (abutment 161) and one on the left side (abutment not shown). The abutments are positioned such that this upper groove 152 faces forward when the seat body faces forward.

A lower groove 153 is created along the ridge between this peripheral edge and the bottom surface of the platen 150, and covers substantially over half of the periphery. This groove 153 is limited by two abutments, one on the right side (abutment 162) and one on the left side (abutment not shown). The abutments are positioned such that this lower groove 153 faces forward when the seat body faces forward.

On the sides of the platen, two peripheral edge overlapping zones 154 have both lower and upper grooves.

The base 149 bears a switch 151 controlling the rotation of the platen 150 as shown in FIGS. 19 and 20. This switch may, according to one particular embodiment, be connected to the platen rotation control means so that it is possible to actuate the switch even when the platen rotation control means cannot change position. In this case, the position is changed subsequently, under the action of the return means, once the platen rotation control means can change position to correspond to the position of the switch.

The switch 151 is slidably mounted on the base 149, in the direction shown by the arrows 1510. It comprises a substantially vertical rod 165, passing through curved oblong holes 157 and 158, respectively formed in tabs 155 and 156, respectively pivotably mounted on the base about the axes 1550 and 1560. According to the positioning of the switch 151, a side portion, 159 or 160, in the shape of a lug, of one of these tabs is inserted respectively in one of the grooves 152 or 153.

On selecting a position of the seat body 2, "forward facing" or "rear facing", the user slides the switch to the left or to the right.

When the seat body is in the "forward facing" position, the switch 151 is to the left and the rod 165 is in the left portions of the oblong holes 157 and 158. The lug 159 is inserted on the upper groove 152 and the lug 160 is removed from the lower groove 153. The rotation of the platen 150 is thus limited by the range of the groove 152 and of the two abutments associated therewith (the abutment 161 on the right and a further abutment on the opposite edge of the platen 150, not shown). Consequently, the platen and the seat body 2 can only be rotated to lateral positions substantially perpendicular to the "forward facing" position. In each of these lateral positions, the switch 151 is facing one of the overlapping zones 154 of the peripheral edge of the platen 150.

To be able to have access to the "rear facing" position, the user should move the seat body to one of these lateral positions in order to be able to slide the switch 151 to the right. The rod 165 can then be moved to the right side of the holes 157 and 158. The lug 159 is then released from the upper groove 152 while the lug 160 is positioned in the lower groove 153. The platen 150 can thus pivot in another angular range extending between the two lateral positions to the right or left via the "rear facing" position, the lug 160 sliding in the groove 153 between the abutments (162 on the right and an equivalent abutment, not shown, on the opposite edge of the platen 150) delimiting same.

Obviously, switching from the "rear facing" angular range to the "forward facing" angular range is performed in an equivalent manner, by moving the switch to the left when the platen is in one of the lateral positions.

Right-Left Locking in the "Forward Facing" Position

Figure 10:
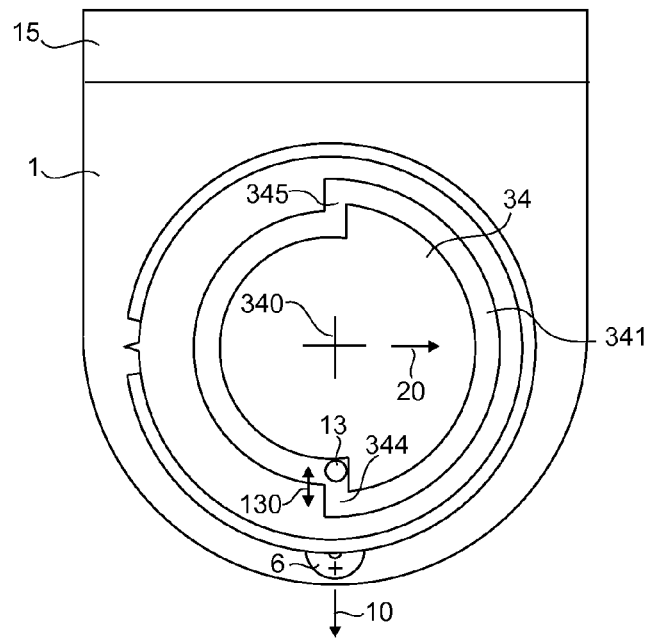
FIG. 10 is a simplified top view of the base and a pivoting support platen when the seat body is facing the left side, in the arranging position, and is free to pivot to the "rear facing" position.

FIGS. 8 to 10 illustrate one particular embodiment of the invention. As shown in these FIG. 8, the edge of the platen 34, which is essentially circular centred on the axis 340, consists of a tab 346 having a thickness which is less than the thickness of the central portion of the platen 34. This tab 346 is discontinued at one zone 348 of the edge of the platen, to the rear of the seat body 2. A lug 347, extending over the entire thickness of the central portion of the platen 34, is situated in the middle of this portion 348.

The edge of the platen 34 engages with a lever 6 pivotably mounted in relation to the base 1 about a vertical axis 61. This lever 6 has a surface 62 suitable for sliding along the outer edge of the tab 346 and a lug 63 suitable for sliding along the top surface of the tab 346.

Figure 11:
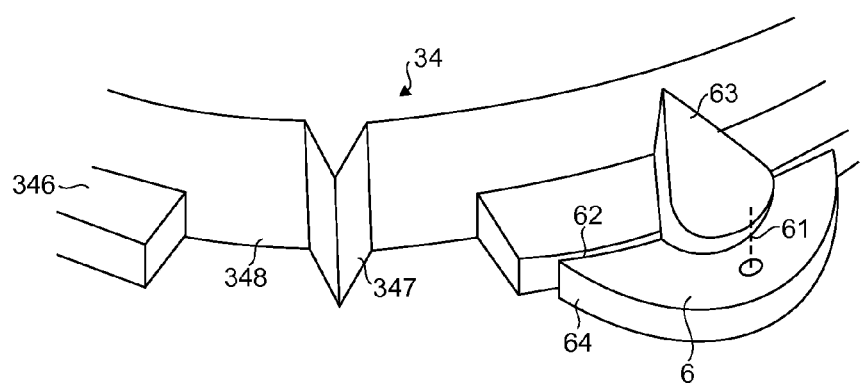
FIG. 11 is a detailed perspective view showing the edge of the pivoting support platen, engaging with elements of the base, when the seat body is close to the "rear facing" position thereof.
Figure 12:
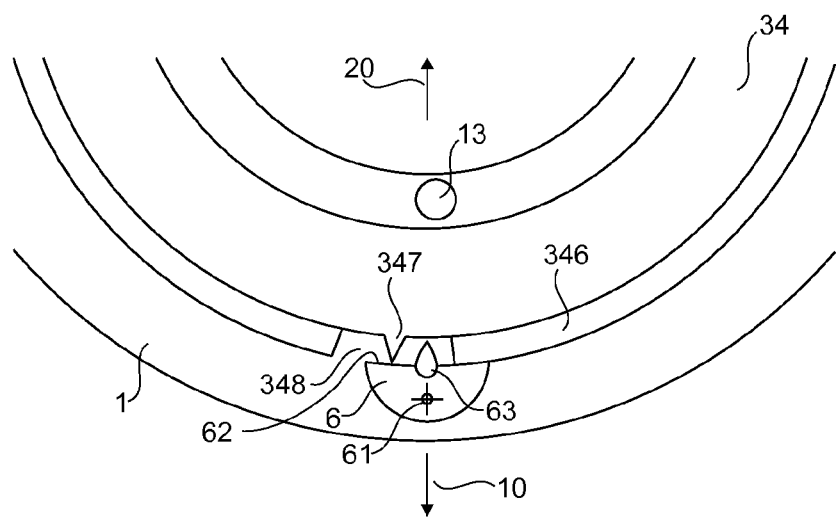
FIG. 12 is a detailed top view showing the edge of the pivoting support platen, engaging with elements of the base, when the seat body is close to the "rear facing" position thereof.
Figure 13:
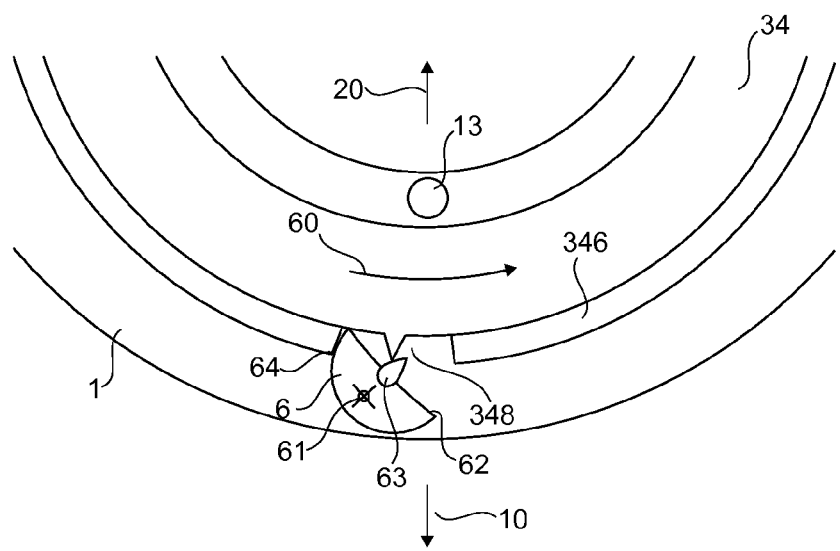
FIG. 13 is a detailed top view showing the edge of the pivoting support platen, engaging with elements of the base, when the seat body is locked in the "rear facing" position.

As shown in FIGS. 11 and 12, while the lug 63 of the lever 6 is not in contact with the lug 347 of the platen 34, the lever 6 does not impede the pivoting of this platen 34. When pivoting of the platen 34 causes the lug 364 of the platen 34 to come into contact with the lug 63 of the lever 6, as shown in FIG. 13, this contact causes pivoting of the lever 6 wherein the surface 62 is, at this point, no longer in contact with the edge of the tab 346. This pivoting abuts the lever 6 preventing the continued rotation of the platen 34 in the direction shown by the arrow in FIG. 13. Indeed, the lever 6 abuts at the lug 63 thereof, in contact with the lug 347, and at the side edge 64 thereof which comes into contact with the end of the tab 346.

Obviously, the lug does not prevent pivoting of the platen in the other direction, which then returns the lever 6 to the position thereof shown in FIGS. 11 and 12. Moreover, it is obvious that the pivoting is locked in the same way when the seat comes from the right or from the left.

This system for locking the rotation of the platen 34 thus makes it possible to prevent the platen 34 from rotating by more than one revolution, while allowing a full 360° rotation of the platen, however. This full rotation is particularly important to enable the correct locking of the seat body in the "rear facing" position, requiring a precise angular position corresponding to the position wherein the platen 34 is locked in rotation by the lever 6, in either direction.

It should be noted that this platen rotation locking system may also be used on a car seat with a pivoting seat body regardless of the other rotation locking or limiting features.

This locking of rotation, preventing the seat from rotating by more than one revolution, may make it possible to prevent a strap (or "top tether") suitable for being connected to the top of the backrest of the seat body, from winding around the seat body, and particularly from winding around the child's head, following improper use. This function may be particularly suitable for a car seat equipped with such a strap mounted on a retractor, for example placed in the backrest of the seat body.

Alternative Embodiment for Locking Rotation

Figure 21:
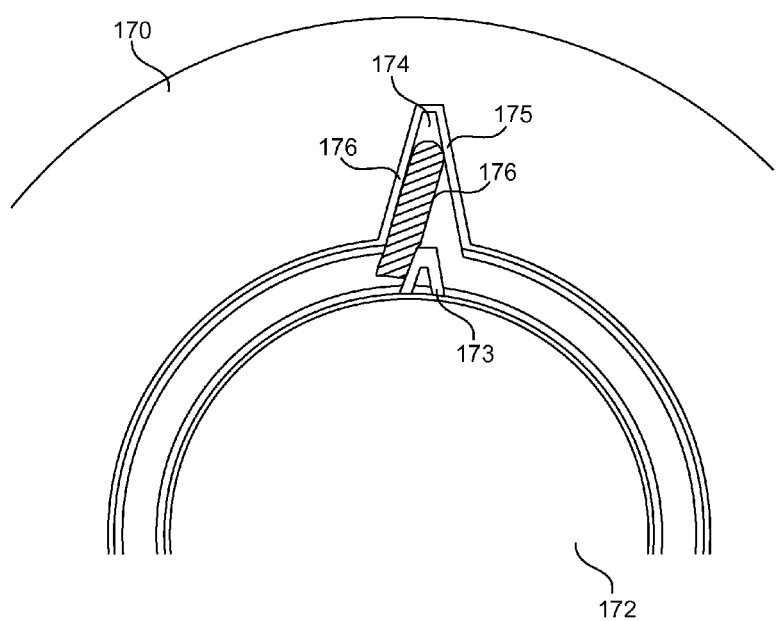
FIG. 21 is a top view of the base and some elements of the pivoting support platen of a car seat according to a further alternative embodiment of the invention, offering a further method for locking the rotation of the platen.

According to one alternative of this aspect, illustrated in FIG. 21, the platen 34 and the lever 6 may be replaced by another system for locking the rotation of the platen supporting the seat body 2.

FIG. 21 is a top view of a base 170, wherein a notch 174 is defined. This notch 174 contains a lever 171, capable of tipping about a substantially vertical axis from right to left, or conversely, within the boundaries of the edges 175 and 176. A platen 172, supporting the seat body (not shown), is pivotably mounted at the centre of the base. This platen comprises a lug 173 suitable for coming into contact with the end of the lever 171.

When the platen 172 pivots in the anti-clockwise direction, the lug 173 comes into contact with the right side of the lever 171 preventing same from continuing to rotate. To complete a full revolution, it is necessary to start in the opposite direction until the lever 171 is encountered again.

This system for locking the rotation of the platen 172 and the lug 173 thus makes it possible to prevent this platen 172 from rotating by more than one revolution, while allowing a full 360° rotation of the platen in both directions.

The invention claimed is:

1. Child car seat, comprising
a base to be positioned on the seat section of a vehicle seat,
a seat body pivotably mounted on said base, about a substantially vertical axis, so as to be suitable for adopting:
at least two travel positions, one wherein the seat body is facing the front of the vehicle and the other wherein the seat body is facing the rear of the vehicle, and
at least one right arranging position, or one left arranging position, wherein the seat body is facing, respectively, the right and the left of the vehicle, and
selection means for selecting one of said travel positions, such that, from the at least one arranging position, said seat body can only be moved to the selected travel position.

2. Child car seat according to claim 1, further comprising for each arranging position, seat body pivoting limiting means for limiting the pivoting of the seat body over a first angular range including the travel position wherein the seat body is facing the front of the vehicle and at least one of said arranging positions, or over a second angular range including the travel position wherein the seat body is facing the rear of the vehicle and at least one of said arranging positions.

3. Child car seat according to claim 2, wherein said selection means comprises at least one selector allowing the user to select the angular zone to which the pivoting of the seat body is limited, said selector being connected to said seat body pivoting limiting means via return means, such that said selector can be set to a selection position corresponding to an angular zone when said seat body is not in said angular zone, the seat body pivoting limiting means limiting the position of the seat body to this angular zone once said seat body enters said angular zone.

4. Child car seat according to claim 2, wherein said seat body pivoting limiting means comprises a substantially horizontal plate wherein a track is marked and a pin is inserted into said track, the plate being rotated in relation to the pin, about the axis of rotation of the seat body, by pivoting the seat body in relation to the base, said pin being movable between at least two positions corresponding to the forward or rear facing travel positions, respectively, and the track being formed such that the pin can only slide in a first portion of the track, when it is in a first position, and only in a second position of the track when it is in a second position.

5. Child car seat according to claim 2, wherein said track is a groove comprising a plurality of interconnected portions, each interconnected portion forming an arc of a circle having a separate radius centred on the axis of rotation of the platen.

6. Child car seat according to claim 1, further comprising second seat body pivoting limiting means for limiting the pivoting of said seat body in relation to said base over an angular range at least equal to 360°.

7. Child car seat according to claim 6, wherein said second seat body pivoting limiting means comprises a platen and a locking part for locking this platen, the platen being rotated in relation to the locking part, about the axis of rotation of the seat body, by pivoting the seat body in relation to the base, the locking part being movable between at least two positions:
an idle position wherein it does not impede the rotation of the platen,
at least one locking position wherein it locks the rotation of the platen in one direction,
the platen bearing a lug suitable for switching the locking part from the idle position thereof to the locking position when the pivoting of the platen brings the lug in contact with the locking part, so as to discontinue this pivoting.

8. Child car seat according to claim 7, wherein said locking part can adopt two separate locking positions according to the direction of rotation of the platen bringing the lug of the platen in contact with the locking part, the lug locking the pivoting of the platen, in each of said locking positions, in this direction of rotation.

9. Child car seat according to claim 8, wherein said locking part is a lever pivotably mounted on said base about a parallel axis in relation to the axis of rotation of the seat body, and suitable for engaging with the edge of said platen.

10. Child car seat according to claim 7, wherein said platen is connected to said seat body, and that said locking part is borne by the base.

11. Child car seat according to claim 1, further comprising means for locking the pivoting of the seat body in relation to the base in each of said travel positions and two pivoting unlocking controls, suitable for enabling the pivoting of the seat body from said travel position to, respectively, a right arranging position and a left arranging position, the car seat also comprising movable selection means for selecting one of said controls, suitable for moving between a first position wherein it is suitable for actuating a first of said controls and prevents the actuation of the second of said controls and a second position wherein it is suitable for actuating the second of said controls and prevents the actuation of the first of said control.

12. Child car seat according to claim 11, wherein the movable selection means comprises a selection plate suitable for moving between a first position wherein it comes into contact with and/or covers at least partially the second of said controls to prevent the actuation thereof and is at a distance from the first of said controls, and a second position wherein it comes into contact with and/or covers at least partially the first of said controls to prevent the actuation thereof and is at a distance from the second of said controls.

13. Child car seat according to claim 12, wherein said selection plate is suitable for moving by sliding between said first and second positions.

14. Child car seat according to claim 12, wherein said selection plate comprises a gripping zone allowing the user to move same between said first and second positions.

15. Child car seat according to, claim 11, further comprising control means for unlocking the pivoting of the position and said movable selection means are placed on the front of an element of the car seat pivotably connected to the seat body.

16. Child car seat according to claim 15, wherein of said controls is actuated by pressing on one face of said control means, said movable selection means preventing access to said face, in any of the positions, to prevent the actuation of said control means.

17. Child car seat according to claim 1, further comprising control means for unlocking the pivoting of the position act, when actuated, as handles for rotating the seat body by the user.

18. Child car seat according to claim 17, wherein said control means is actuated by pressing on one face of said control means, said movable selection means preventing access to said face, in any of the positions, to prevent the actuation of said control means.

\* \* \* \* \*